Feb. 7, 1928.

J. P. BALL 1,658,183

VIBRATION DETECTOR

Filed May 11, 1925

Inventor,
John P. Ball,

Patented Feb. 7, 1928.

1,658,183

UNITED STATES PATENT OFFICE.

JOHN P. BALL, OF CHICAGO, ILLINOIS.

VIBRATION DETECTOR.

Application filed May 11, 1925. Serial No. 29,422.

This invention relates to a vibration detector or indicator in the form of automatic spinning wheels especially designed to show the amount of circulatory vibrations in an engine, centrifugal pump, gyrator or other device that has revolving parts or main fly wheels; also in gyroscopes where the axle of the fly wheel is slightly eccentric or for other causes vibrations or vibratory motion is given to the frame or holding parts, and such vibrations, it is found, give rise to deviations of the gyroscope and also are destructive to the gimbal bearings.

My invention as disclosed in the exemplification may also be employed as a toy gyroscope or spinning top equipped with finely adjusted spinning wheels, at the end or ends of a stiff wire or wires; the wheels automatically spinning with the rotary vibrations transmitted to the gimbal frame of the gyroscope; the rate at which the superposed wheels spin indicating the amount of vibration induced by the revolving parts of the engine or by the wheel of the gyroscope.

Referring to the drawing which forms a part of my specification I disclose a simple embodiment of my invention in the form of gyroscope.

Figure 1:
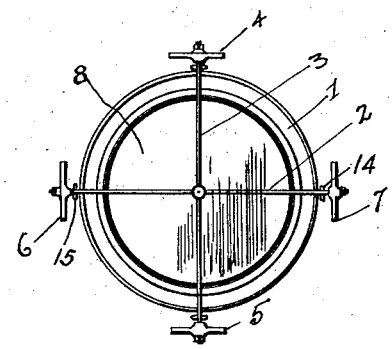
Figure 1 is a plan view of a gyroscope and the elements affected by the vibration set up in the gyroscope proper.

As a result of repeated experiments, I have found that comparatively light discs or wheels, provided with suitable bearings and free to revolve at the ends of a fine axle or thin rod, will be induced to turn or rotate by the vibrations transmitted from the gyroscope frame to the axle.

As stated above, by repeated trials, it was found that with a fine stiff needle or spindle arranged in a radial manner relative to and preferably at the upper end of the main axis of the frame of a gyroscope, with one end secured to the frame and the other end free, the free end will quiver or vibrate in a rotary manner, and if a delicate wheel is journalled on the outer end of this spindle, it will rotate in a similar manner. After many experiments, I determined that the principal cause of the spinning of the wheel was due to the unbalanced condition of the main fly wheel of the gyroscope, and the greater the unbalance, the greater or speedier will be the spinning; the revolutions or speed of the indicator wheel at the end of the spindle determining the amount of unbalance of the fly wheel of the gyroscope.

As an exemplification of my invention, I have shown mounted on a gimbal frame 1 a plurality of supporting members or rods 2 and 3, preferably two in number, which support four free bearing spinning wheels 4, 5, 6 and 7, which are sensitive to the rotary vibrations transmitted through the frame of the gyroscope and the supporting members. Any suitable type of gyroscope may be employed, but for sake of illustration this gyroscope is shown as comprising a fly wheel 8, fixed to a shaft or axle 9, which is rotatably mounted at its ends in the ring or frame 1, by bearings 10 and 11 secured to the ring 1; a boss or knob 12 being mounted on top of the frame 1 in axial alignment with shaft 9. The supporting members or rods 2 and 3 for the spinning wheels 4, 5, 6 and 7 are in turn mounted on this boss 12.

In practice the gyroscope may be actuated in any suitable manner, as for example by means of a string 13, wound on a portion of the axle 9; the axle being preferably apertured transversely to facilitate the association of the string therewith.

Figure 2:
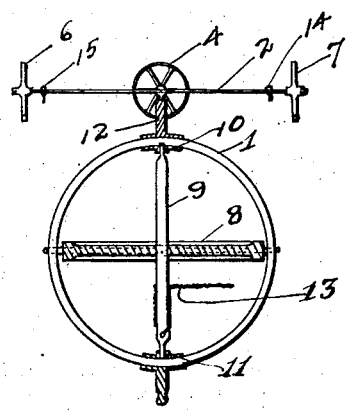
Figure 2 is a side view of the same, with a portion shown in section.

In order to give a more stable movement in the arms or axles 2 and 3, a slight uniform counterweight as shown in Figure 2 and indicated as 14 and 15 is preferably affixed thereto.

The portions 14 and 15 are merely small stops or lugs formed on the spindles or rods 2 and 3, preferably at uniform distances from the respective wheels on the rods so as to prevent the too far inward movement of said wheels lengthwise of the respective spindles or rods; the stops being preferably identical with each other so as to also counterbalance each other.

What I claim is:—

1. A vibration detector for indicating circulatory vibration, comprising a supporting post, spindles arranged at right angles to each other and radiating from said supporting post, and uniform members loosely mounted on the outer ends of the spindles so as to be free to rotate on the spindles.

2. A vibration detector for testing circulatory vibrations in the supporting frame of a rotating element comprising a spindle pivoted at one end on said frame at a point in alignment with the vertical axis of the rotating element, and a free bearing wheel mounted on the outer end of the spindle in axial relation thereto.

3. In an apparatus for testing circulatory vibrations comprising a supporting frame in which a rotating element is mounted, a rod pivotally mounted on the supporting frame, and a free running wheel mounted on the outer end of the rod.

JOHN P. BALL.